United States Patent
Dreischarf et al.

(10) Patent No.: US 10,428,834 B2
(45) Date of Patent: Oct. 1, 2019

(54) TURBINE ENGINE COOLER ASSEMBLY

(71) Applicant: Unison Industries, LLC, Jacksonville, FL (US)

(72) Inventors: Derek Thomas Dreischarf, Bellbrook, OH (US); Bernard Albert Luschek, Lebanon, OH (US); Dennis Alan McQueen, Miamisburg, OH (US); Daniel Scott McCann, Centerville, OH (US); Anthony Lynn Lighthill, Springboro, OH (US)

(73) Assignee: Unison Industries, LLC, Jacksonville, FL (US)

( * ) Notice: Subject to any disclaimer, the term of this patent is extended or adjusted under 35 U.S.C. 154(b) by 604 days.

(21) Appl. No.: 15/157,648

(22) Filed: May 18, 2016

(65) Prior Publication Data

US 2017/0335863 A1     Nov. 23, 2017

(51) Int. Cl.

| | |
|---|---|
| *F04D 29/58* | (2006.01) |
| *F02K 3/115* | (2006.01) |
| *F02C 7/00* | (2006.01) |
| *F02C 7/14* | (2006.01) |
| *F04D 29/52* | (2006.01) |

(Continued)

(52) U.S. Cl.
CPC .......... *F04D 29/5826* (2013.01); *F02C 7/00* (2013.01); *F02C 7/14* (2013.01); *F02K 3/115* (2013.01); *F04D 29/522* (2013.01); *F04D 29/644* (2013.01); *F04D 29/668* (2013.01); *F05B 2220/33* (2013.01); *F05B 2260/20* (2013.01); *F05B 2260/50* (2013.01);

(Continued)

(58) Field of Classification Search
CPC .. F04D 29/5826; F04D 29/522; F04D 29/644; F04D 29/668; F02C 7/14; F02C 7/00; F02K 3/115; F05B 2260/50; F05B 2260/20; F05B 2220/33; F05D 2260/30; F05D 2260/213; F05D 2240/91; Y02T 50/675
See application file for complete search history.

(56) References Cited

U.S. PATENT DOCUMENTS

| | | | |
|---|---|---|---|
| 8,181,443 B2 * | 5/2012 | Rago | F01D 11/24 |
| | | | 415/116 |
| 8,510,945 B2 * | 8/2013 | Hand | F02K 1/822 |
| | | | 248/638 |

(Continued)

FOREIGN PATENT DOCUMENTS

| | | |
|---|---|---|
| EP | 2 339 144 A2 | 6/2011 |
| EP | 2 636 982 A2 | 9/2013 |

(Continued)

OTHER PUBLICATIONS

International Search Report and Written Opinion issued in connection with corresponding PCT Application No. PCT/US17/33317 dated Aug. 21, 2017.

*Primary Examiner* — Justin D Seabe
*Assistant Examiner* — Adam W Brown
(74) *Attorney, Agent, or Firm* — McGarry Bair PC (57) ABSTRACT

A fan casing assembly for a turbine engine including a casing having an annular fan cooler. The annular fan cooler includes first and second connection assemblies to fix movement of the fan cooler during engine operation, while permitting circumferential thermal growth of the fan cooler without suffering from high cycle fatigue.

20 Claims, 12 Drawing Sheets

(51) Int. Cl.
*F04D 29/64* (2006.01)
*F04D 29/66* (2006.01)

(52) U.S. Cl.
CPC .... *F05D 2240/91* (2013.01); *F05D 2260/213* (2013.01); *F05D 2260/30* (2013.01); *Y02T 50/675* (2013.01)

(56) References Cited

U.S. PATENT DOCUMENTS

| | | | | |
|---|---|---|---|---|
| 8,601,791 | B2* | 12/2013 | Bajusz | F28F 9/0075 |
| | | | | 60/226.1 |
| 9,677,474 | B2* | 6/2017 | Hundley, Jr. | F02C 7/12 |
| 2011/0146944 | A1* | 6/2011 | Hand | F02K 1/822 |
| | | | | 165/47 |
| 2012/0285138 | A1 | 11/2012 | Todorovic | |
| 2013/0011246 | A1 | 1/2013 | Todorovic | |
| 2015/0135726 | A1 | 5/2015 | Hundley, Jr. et al. | |
| 2016/0131035 | A1 | 5/2016 | Diaz et al. | |
| 2016/0169026 | A1* | 6/2016 | Jones | F01D 11/24 |
| | | | | 415/1 |
| 2017/0198974 | A1* | 7/2017 | Cerny | F02C 7/185 |
| 2017/0298763 | A1* | 10/2017 | Olver | F01D 25/14 |

FOREIGN PATENT DOCUMENTS

| | | | |
|---|---|---|---|
| EP | 2 966 395 | A1 | 1/2016 |
| FR | 2 990 001 | A1 | 11/2013 |

* cited by examiner

TURBINE ENGINE COOLER ASSEMBLY

BACKGROUND OF THE INVENTION

Contemporary engines used in aircraft produce substantial amounts of heat that must be transferred away from the engine in one way or another. Heat exchangers provide a way to transfer heat away from such engines. For example, heat exchangers can be arranged in a ring about a portion of the engine.

One type of heat exchanger used is a surface cooler that is mounted to an aft fan casing. However, the space in this region of the engine is limited and current designs utilize nearly all the available space. As a result, newer engine technologies, which have more heat that must be dissipated, will be thermally constrained due to the lack of space available. The problem is further exacerbated in that new engine designs are becoming further space constrained, making the size and weight of the current types of coolers and their mounting systems prohibitive.

An additional problem is that the heat exchangers are subject to relatively high temperatures that cause them to expand thermally, especially laterally or tangentially, yet need to remain fixed to the engine to prevent high cycle fatigue from engine vibration. Generally, such heat exchangers do not account for the thermal expansion during operation resulting in fatigue. Thus, a heat exchanger that allows for thermal expansion during operation while requiring minimal spacing is necessary.

BRIEF DESCRIPTION OF THE INVENTION

In one aspect an embodiment of the invention relates to a fan casing assembly including an casing having a peripheral wall, an surface cooler having a first surface confronting the peripheral wall and having a first end spaced from a second end and opposing forward and aft edges, a first connection assembly having a primary locator configured to locate the first end of the surface cooler to the casing and prevent forward movement and aft movement of the casing, and a second connection assembly having a secondary locator that is configured to locate the second end of the surface cooler with respect to the casing and where the secondary locator allows for circumferential thermal growth.

In another aspect an embodiment of the invention relates to a fan casing assembly including an casing having a peripheral wall, an surface cooler having a first surface confronting the peripheral wall and having a first end spaced form the a second end and opposing forward and aft edges wherein the surface cooler is mounted to the casing via a first connection at the first end of the surface cooler and via a second connection at the second end of the surface cooler and where the second connection is free in the circumferential direction such that the surface cooler can thermally grow circumferentially.

In yet another aspect an embodiment of the invention relates to a fan casing assembly including an casing having a peripheral wall, an surface cooler having a first surface confronting the peripheral wall and having a first end and a second end, a fixed connection mounting a first end of the surface cooler to the casing, and a floating connection mounting the second end of the surface cooler to the casing and configured to allow for thermal growth.

DESCRIPTION OF EMBODIMENTS OF THE INVENTION

Embodiment disclosed herein relate to surface coolers and more particularly to systems for interconnecting elements of the surface coolers in an engine such as an aircraft engine. The exemplary surface coolers can be used for providing efficient cooling. Further, the term "surface coolers" as used herein can be used interchangeably with the term "heat exchangers." As used herein, the surface coolers are applicable to various types of applications such as, but not limited to, turbojets, turbo fans, turbo propulsion engines, aircraft engines, gas turbines, steam turbines, wind turbines, and water turbines.

Figure 1:
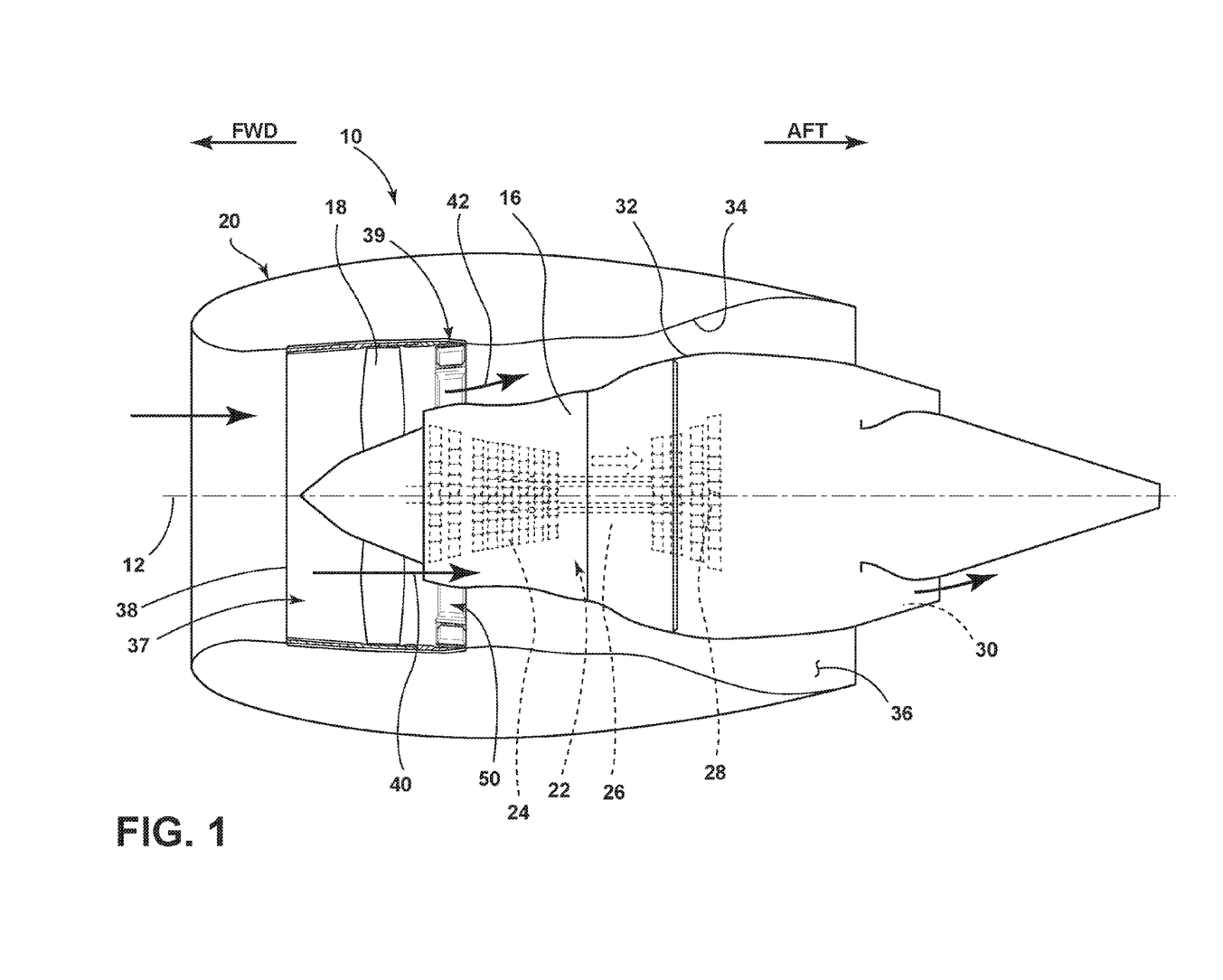
FIG. 1 is a schematic partially cut away view of a turbine engine assembly with a surface cooler and mounting system according to an embodiment of the invention.

Thus, referring to FIG. 1, a brief explanation of the environment in which embodiments of the invention can be used is described. More specifically, FIG. 1 illustrates an exemplary turbine engine assembly 10 having a longitudinal axis 12. A turbine engine 16, a fan assembly 18, and a nacelle 20 can be included in the turbine engine assembly 10. The turbine engine 16 can include an engine core 22 having compressor(s) 24, combustion section 26, turbine(s) 28, and exhaust 30. An inner cowl 32 radially surrounds the engine core 22.

Portions of the nacelle 20 have been cut away for clarity. The nacelle 20 surrounds the turbine engine 16 including the inner cowl 32. In this manner, the nacelle 20 forms an outer cowl 34 radially surrounding the inner cowl 32. The outer cowl 34 is spaced from the inner cowl 32 to form an annular passage 36 between the inner cowl 32 and the outer cowl 34. The annular passage 36 characterizes, forms, or otherwise defines a nozzle and a generally forward-to-aft bypass airflow path. A fan casing assembly 37 having an annular forward casing 38 and an aft casing 39 can form a portion of the outer cowl 34 formed by the nacelle 20 or can be suspended from portions of the nacelle 20 via struts (not shown).

In operation, air flows through the fan assembly 18 and a first portion 40 of the airflow is channeled through compressor(s) 24 wherein the airflow is further compressed and delivered to the combustion section 26. Hot products of combustion (not shown) from the combustion section 26 are utilized to drive turbine(s) 28 and thus produce engine thrust. The annular passage 36 is utilized to bypass a second portion 42 of the airflow discharged from fan assembly 18 around engine core 22.

Figure 2:
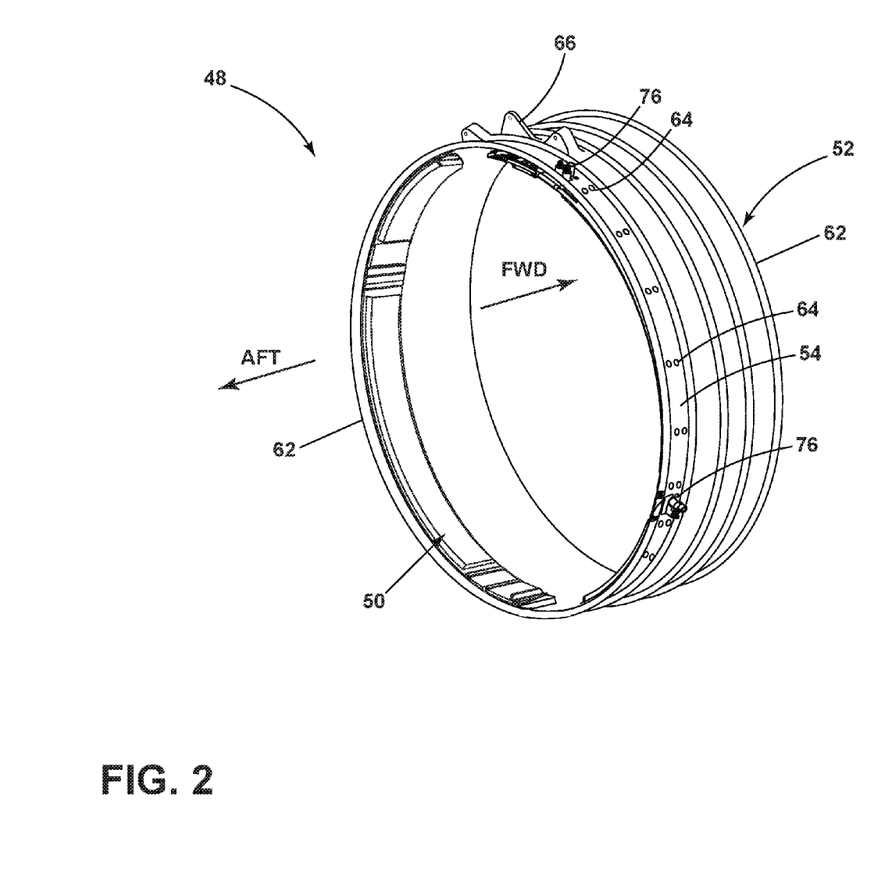
FIG. 2 is a perspective view of an aft portion of a casing, the surface cooler, and mounts that can be included in the turbine engine assembly of FIG. 1.

The turbine engine assembly 10 can pose unique thermal management challenges and a heat exchanger system or surface cooler 50 can be attached to the turbine engine assembly 10 to aid in the dissipation of heat. In the exemplary embodiment, the surface cooler 50 can be an annular fan surface cooler 50 that can be operably coupled to a casing 52 having a peripheral wall 54 (FIG. 2) that forms an interior portion of the outer cowl 34. The casing 52, in non-limiting examples, can be the fan casing assembly 37, or the forward casing 38 or aft casing 39. It should be appreciated that the casing 52 can be any casing region, such that the casing encloses any structural hardware that is part of the annular duct defined by the casing assembly 52. Thus, the surface cooler 50 can couple to the casing 52 at any position along the duct defined by the casing assembly 37. FIG. 2 illustrates one exemplary embodiment of the casing 52 of the fan casing assembly 37 (FIG. 1). The surface cooler 50 can cover any portion of the peripheral wall 54, and is not limited to the size as illustrated. It will be understood that a set of surface coolers 50 can be utilized to cool a single turbine engine assembly 10. It will be understood that "a set" as used herein can include any number including only one. Such a set can be disposed in axial arrangement along the peripheral wall 54. The casing 52 includes a forward edge 60 and an opposing aft edge 62. Fan casing fastener openings 64 pass through the peripheral wall 54 as well as manifold openings 76. Multiple casing mounts 66 can mount along the exterior of the casing 52 for mounting the casing 52 to the outer cowl 34. Such casing mounts 66 can include, but are not limited to, clevis mounts.

The surface cooler 50 can include, but is not limited to, an air-cooled heat exchanger that is positioned on the casing 52. While the surface cooler 50 has been illustrated as being downstream of the fan assembly 18 it is also contemplated that the surface cooler 50 can alternatively be upstream from fan assembly 18, or at any position along the outer cowl 34. As such, it will be understood that the surface cooler 50 can be positioned anywhere along the axial length of the annular passage 36. As such, the annular casing 52 and surface cooler 50 can form a portion of a fan casing assembly 48.

Figure 3:
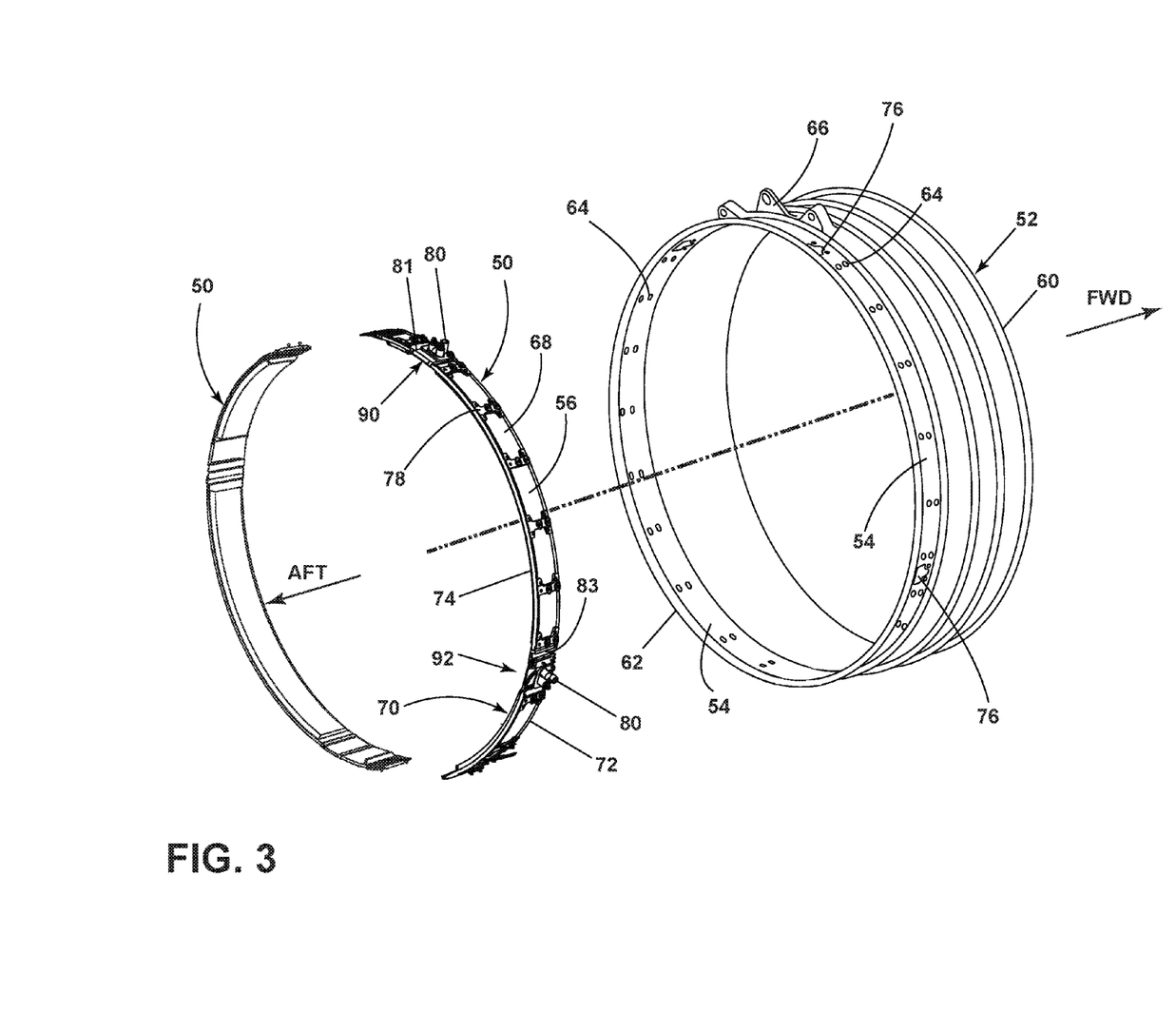
FIG. 3 is a partially exploded perspective view of the portion of the casing of FIG. 2 having two surface coolers exploded therefrom.

The partially exploded view of FIG. 3 illustrates the surface cooler 50 removed from the casing 52. The surface cooler 50 includes a first surface 56 which can confront the peripheral wall 54 at mounting. In the combined position, an interior surface 70 of the surface cooler 50 forms a portion of the outer cowl 34 (FIG. 1). The surface cooler 50 includes a first end 81 spaced from a second end 83 and having a forward edge 72 and an opposing aft edge 74. The surface cooler 50 can include a circumferential and axial annular shape that is substantially similar to the circumferential shape of the peripheral wall 54 facilitating mounting thereto.

The casing 52 further includes the fastener openings 64 and manifold openings 76. The surface cooler includes a plurality of mount brackets 78 and cooler manifolds 80 coupled to a body 68. The fastener openings 64 and manifold openings 76 are adapted to align with and receive, respectively, mount brackets 78 and cooler manifolds 80 mounted onto the surface cooler 50. The fastener openings 64 receive the mount brackets 78 for mounting the surface cooler 50 to the casing 52. The manifold openings 76 receive the cooler manifolds 80 radially through the casing 52 for receiving fluid provided to the surface cooler 50. While the surface cooler 50 is shown having two cooler manifolds 80 and a plurality of mount brackets 78, any number of cooler manifolds 80 and mounting brackets 78 are contemplated. The cooler manifolds 80 can be separated into separate connection assemblies, defining a first connection assembly 90 and a second connection assembly 92.

Figure 4:
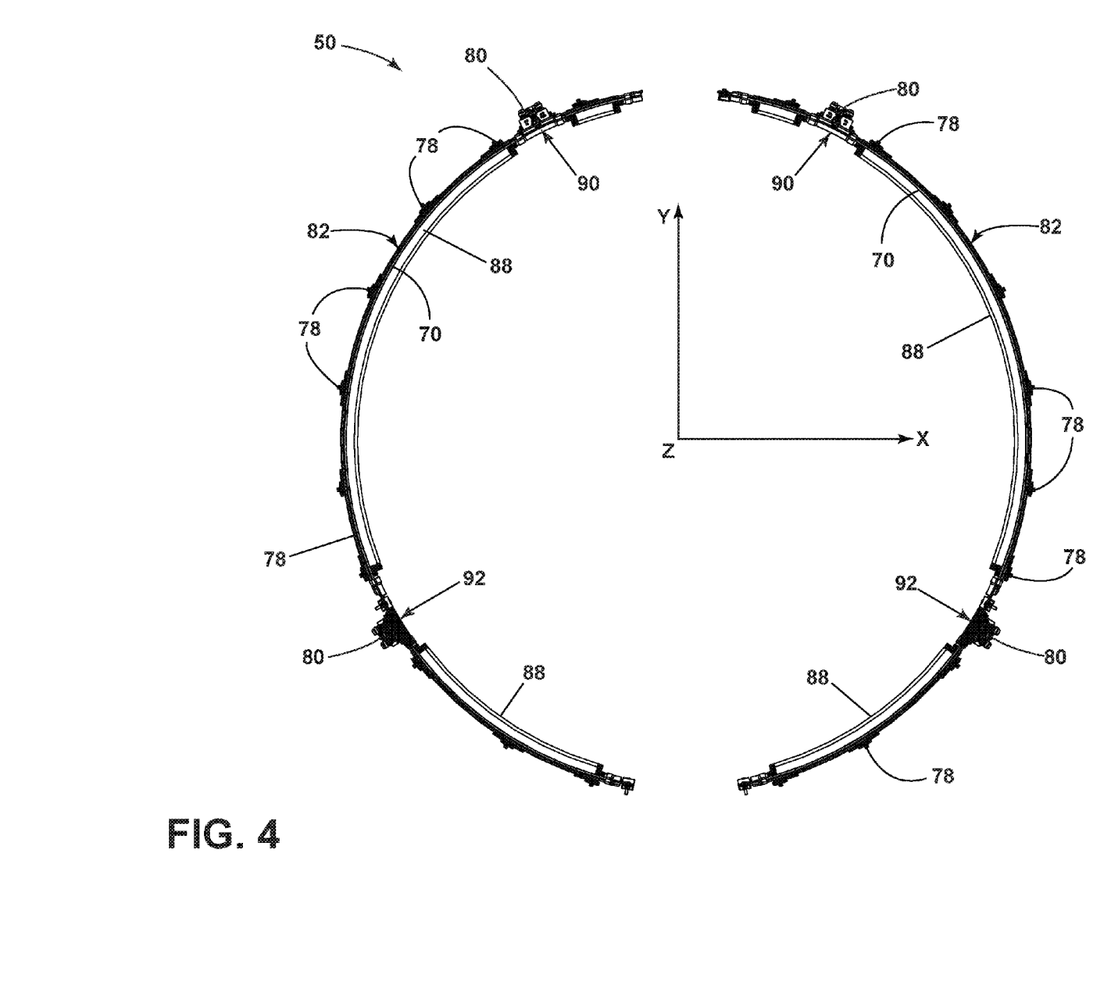
FIG. 4 is an axial view of the surface cooler showing four manifolds.

FIG. 4 illustrates an axial view of the surface cooler 50 looking aft, having two cooler portions 82 defining the complete annular fan surface cooler 50. The cooler portions 82 can couple to form the substantially annular surface cooler 50. A set of heat exchanger pads 88 mount along an inner surface 70 of the surface cooler 50. The cooler manifolds 80 can provide a flow of cooling fluid to the heat exchanger pads 88 for transferring heat away from the engine 10.

The surface cooler 50 can be subject to six degrees of freedom, including three rotational degrees and three translational degrees. As illustrated, the three translational degrees of freedom can be linear respective of the X-axis, Y-axis, and Z-axis. As such, during engine operation, the surface cooler 50 can move side-to-side along the X-axis in a first degree of translational freedom, up and down along the Y-axis in a second degree of translational freedom, and in or out of the page in an axial direction along the Z-axis in a third degree of translational freedom. Similarly, the three rotational degrees of freedom can be rotated respective of the X-axis, Y-axis, and Z-axis. As such, a first rotational degree of freedom can be rotated about the X-axis, a second rotational degree of freedom can be rotated about the Y-axis, and a third rotational degree of freedom can be rotated about the Z-axis.

The first connection assembly 90 can include a fixed connection for mounting the surface cooler to the casing 52. The first connection assembly 90 prevents movement of the surface cooler 50 relative to the casing 52. It is desirable to have the first connection assembly 90 be structurally fixed relative to all six degrees of freedom. The structural fixation of the surface cooler 50 prevents axial movement, providing clearance to forward and aft adjacent hardware. Such clearance ensures that the surface cooler 50 does not interrupt function of the adjacent hardware. Thus, the structural fixation provides precise positioning of the surface cooler 50 to maintain the clearance to the forward and aft adjacent hardware.

The second connection assembly 92 can include a floating connection permitting thermal expansion of the surface cooler 50 relative to the casing 52. It is desirable to have the second connection assembly 92 to be structurally fixed relative to five degrees or freedom and being free to move relative to the third rotational degree or freedom to rotate about the Z-axis. Being free to rotate about the Z-axis enables the surface cooler 50 to expand or contract circumferentially due to thermal growth associated with temperature differentials during engine operation. Additionally, the freedom to rotate about the Z-axis provides for dampening high cycle fatigue vibration during operation of the turbine engine assembly 10.

Figure 5:
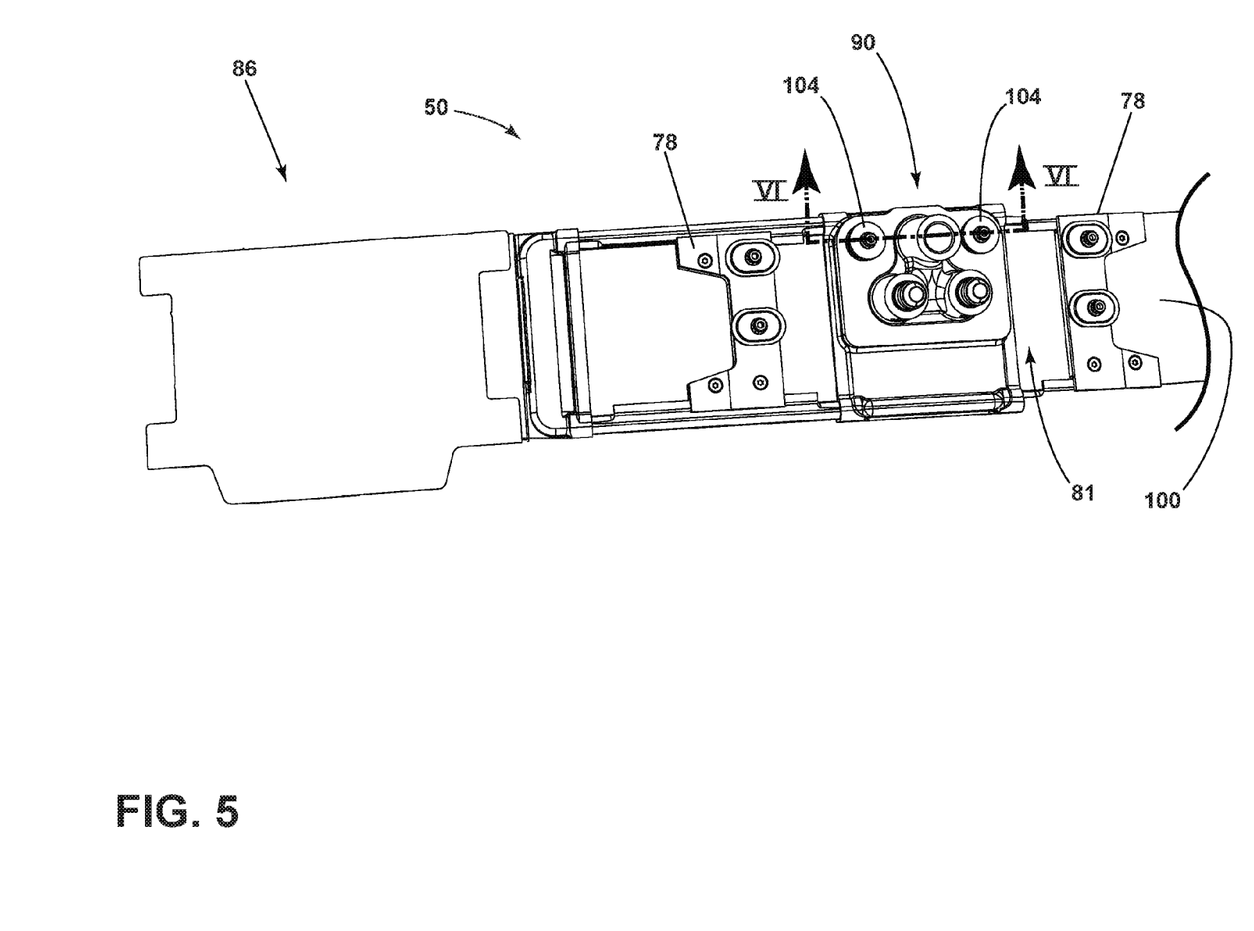
FIG. 5 is an enlarged perspective view of a portion of the surface cooler of FIG. 2 having the manifold.

As better shown in FIG. 5, the first connection assembly 90 is positioned along an outer surface 100 of the surface cooler 50. The first connection assembly 90 includes at least one fastener 104. The fastener 104 couples the manifold 80 to the surface cooler 50.

Figure 6:
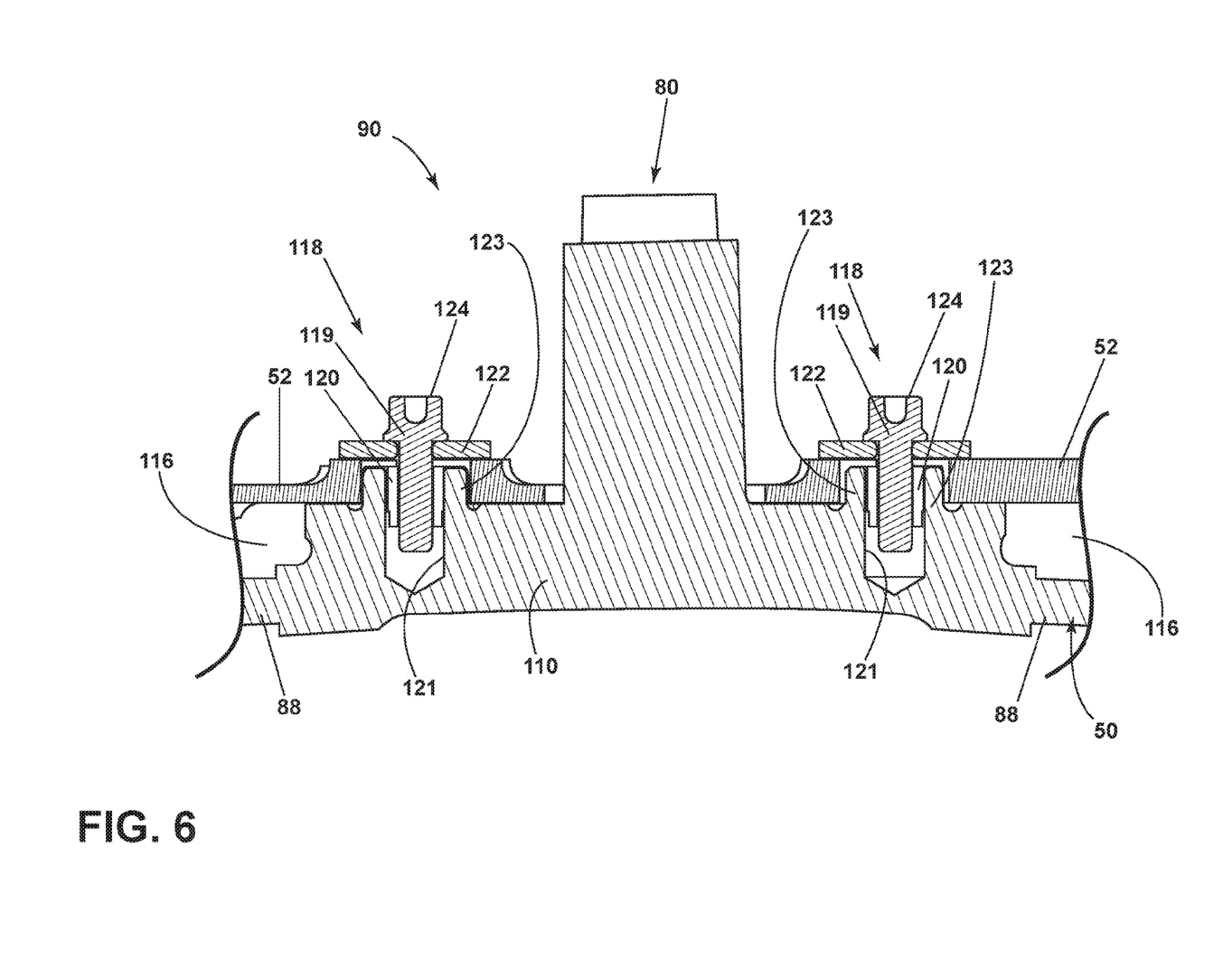
FIG. 6 is a cross-sectional view of the manifold of FIG. 5.

Looking now at FIG. 6, illustrating the section taken along section VI-VI of FIG. 5, shows the interior of the first connection assembly 90, including the casing 52 mounted to the radial exterior of the surface cooler 50. The surface cooler 50 and the casing 52 are spaced from one another defining gap 116 disposed therebetween. The first connection assembly 90 includes a manifold 110. The manifold can include at least one nozzle 102, two location posts 118, two locators 123, and two recesses 121. The location posts 118 can be the fasteners 104 of FIG. 5.

The nozzles 102 provide a flow of fluid to the heat exchanger 88. It should be understood that the cooler manifold 80 can also operate as an outlet rather than an inlet, providing for removal of fluid, such as air, from the heat exchangers 88 as opposed to providing the fluid. As such, multiple cooler manifolds 80 can be spaced about the surface cooler 50 for providing ingress and egress for a cooling fluid. Alternatively, the flow of fluid can exhaust from the surface cooler 50 in another manner, such as being exhausted to the flow or air moving through the outer cowl 34.

The location post 118 can be a precision machined pin having a threaded insert 120 disposed within the recess 121. The threaded insert 120 is positioned within the locators 123 to particularly locate the location post 118. The threaded insert 120 can be integral to the manifold 110. A bolt 119 having a washer 122 and a bolt head 124 can further be included in the first connection assembly 90.

The first connection 90 couples the surface cooler 50 to the casing 52 at the manifold 110. More specifically, the location post 118 and bolt 119 can be configured to locate the surface cooler to the casing 52 using the locator 123. The bolt 119 can insert into the threaded insert 120. The washer 122 can be utilized to secure the bolt 119 against the casing 52 without requiring the head 124 of the threaded insert 120 to hold the casing 52 at the location post 118. The location post 118 prevents forward movement and aft movement of the casing 52.

The first connection assembly 90 incorporates a close-clearance fit with the casing 52 and constrains all six degrees of freedom. This is accomplished using the threaded aperture 120 disposed within the locator 123 to align and affix the location post 118. Thus, the structural fixation of the six degrees of freedom of the first connection assembly 90 is achieved with the location post 118 and bolt 119. The surface cooler 50 is prevented from moving forward or aft, maintaining clearance between the forward and aft adjacent hardware.

Figure 7:
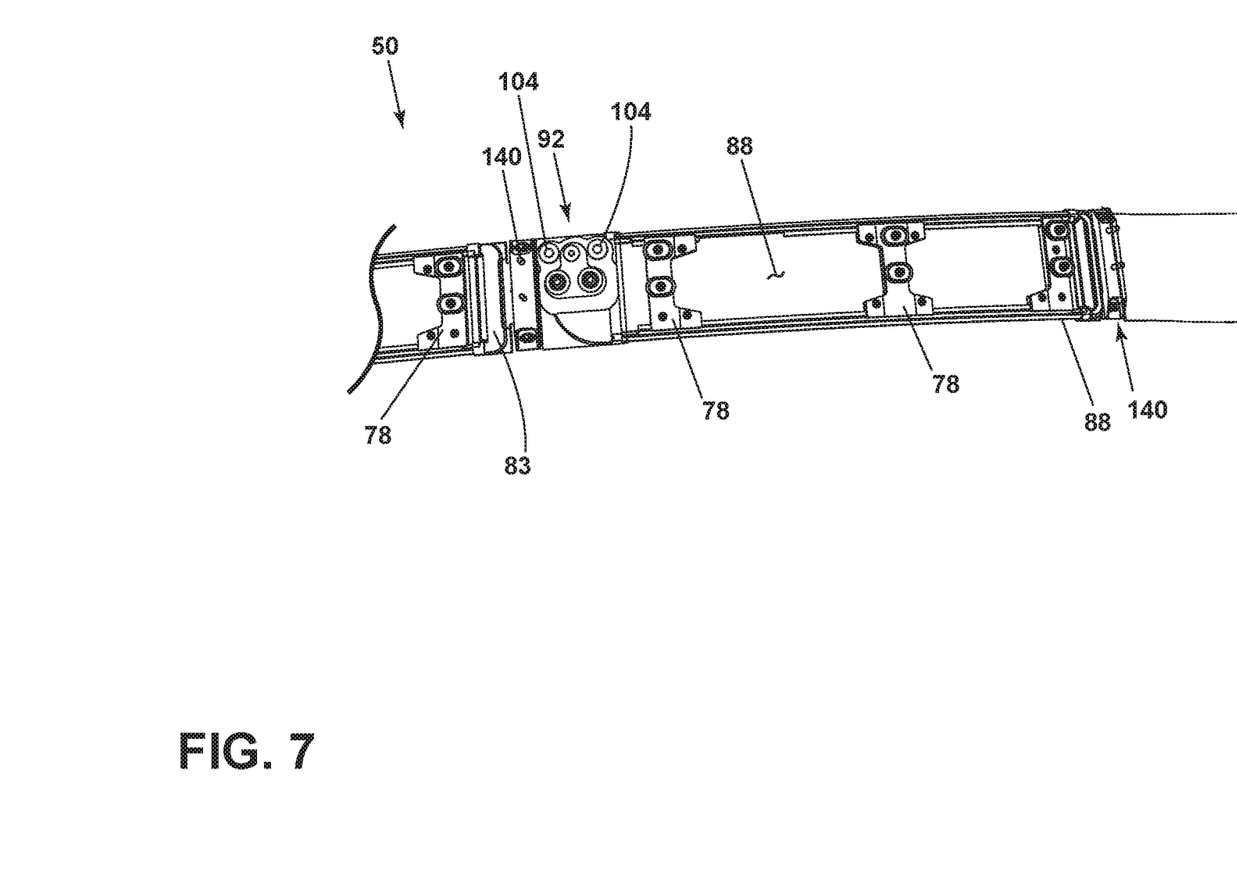
FIG. 7 is an enlarged perspective view of another portion of the surface cooler of FIG. 2 having a secondary locator.
Figure 8:
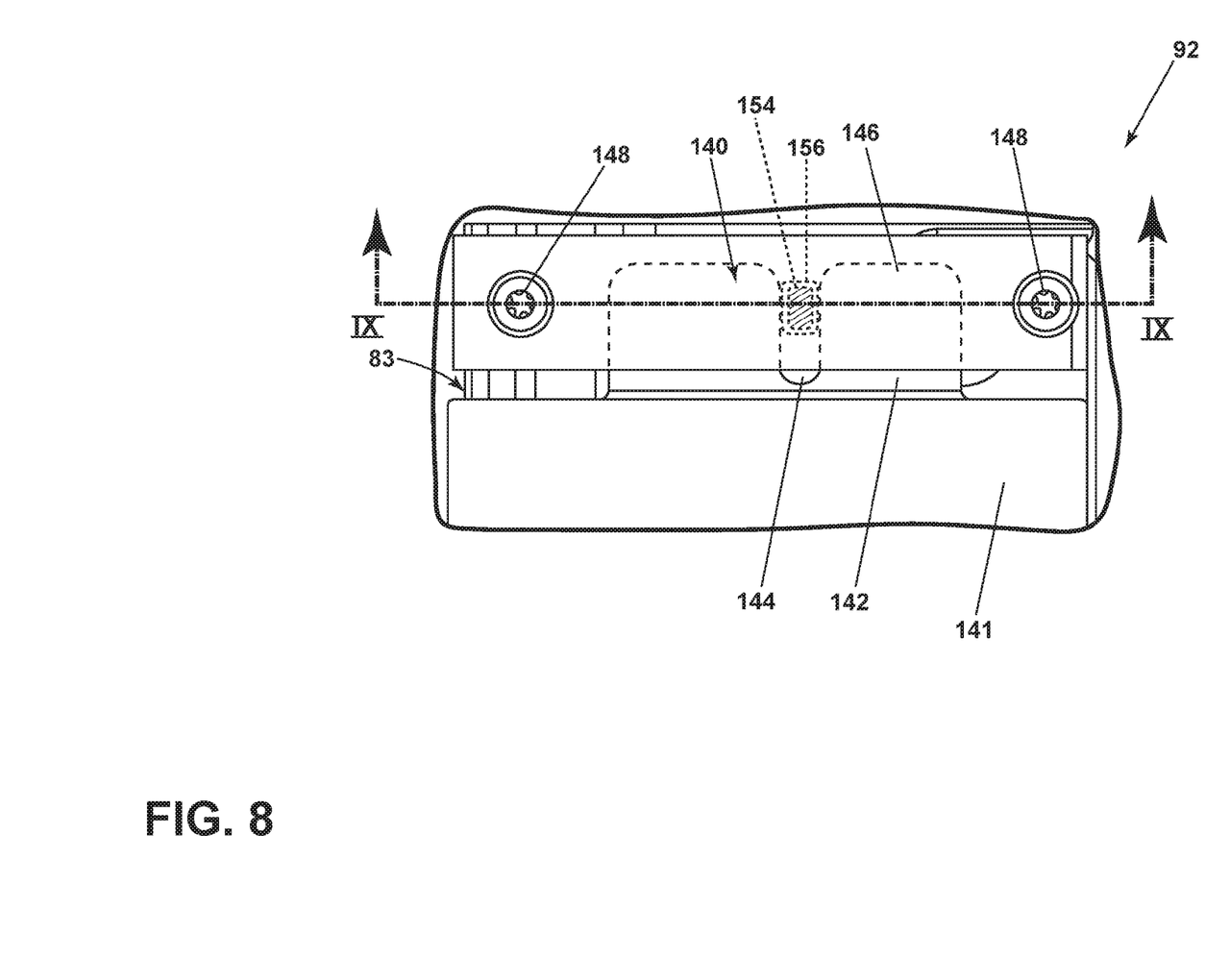
FIG. 8 is a radially inner view looking outward at the secondary locator of FIG. 7.

Referring now to FIG. 7, a rotated view of the surface cooler 50 shows the second connection assembly 92. The second connection assembly 92 includes a collar 140 and a heat exchanger manifold 141, shown in FIG. 8. FIG. 8 shows an enlarged view of the bottom of the collar 140 and the heat exchanger manifold 141, looking radially outwardly. The heat exchanger manifold 141 couples the second end 83 at the collar 140. The heat exchanger manifold 141 includes an extension 142 (partially shown in phantom) having a slot 144 formed in the extension 142. The extension 142 extends from the second end 83 into the collar 140 to position the second end 83 relative to the collar 140. It should be appreciated that the second connection assembly 92 is different than the first connection assembly 90 described in FIGS. 5 and 6. Specifically, the collar 140 included with the second connection assembly 92 is absent from the first connection assembly 90.

The second connection assembly 92 further includes positional locator as a post 154 having a wear attenuator collar 156. The combined post 154 and wear attenuator collar 156 are adapted to slidably insert in the slot 144 of the exchanger manifold 141.

The collar 140 includes a bracket cover plate 146 and two fasteners 148. The remainder of the collar 140 is best seen in the cross-sectional view of FIG. 9, taken across section IX-IX of FIG. 8. The cover plate 146, internally, includes two recesses 166. Two wear attenuator pads 168 are disposed in the recesses 166 of the cover plate 146 and abut the extensions 142. The collar 140 further includes a base bracket 150. A set of casing fasteners 152 mounts the base bracket 150 to the casing 52 and the two fasteners 148 mount the base bracket 150 to the cover plate 146.

Figure 9:
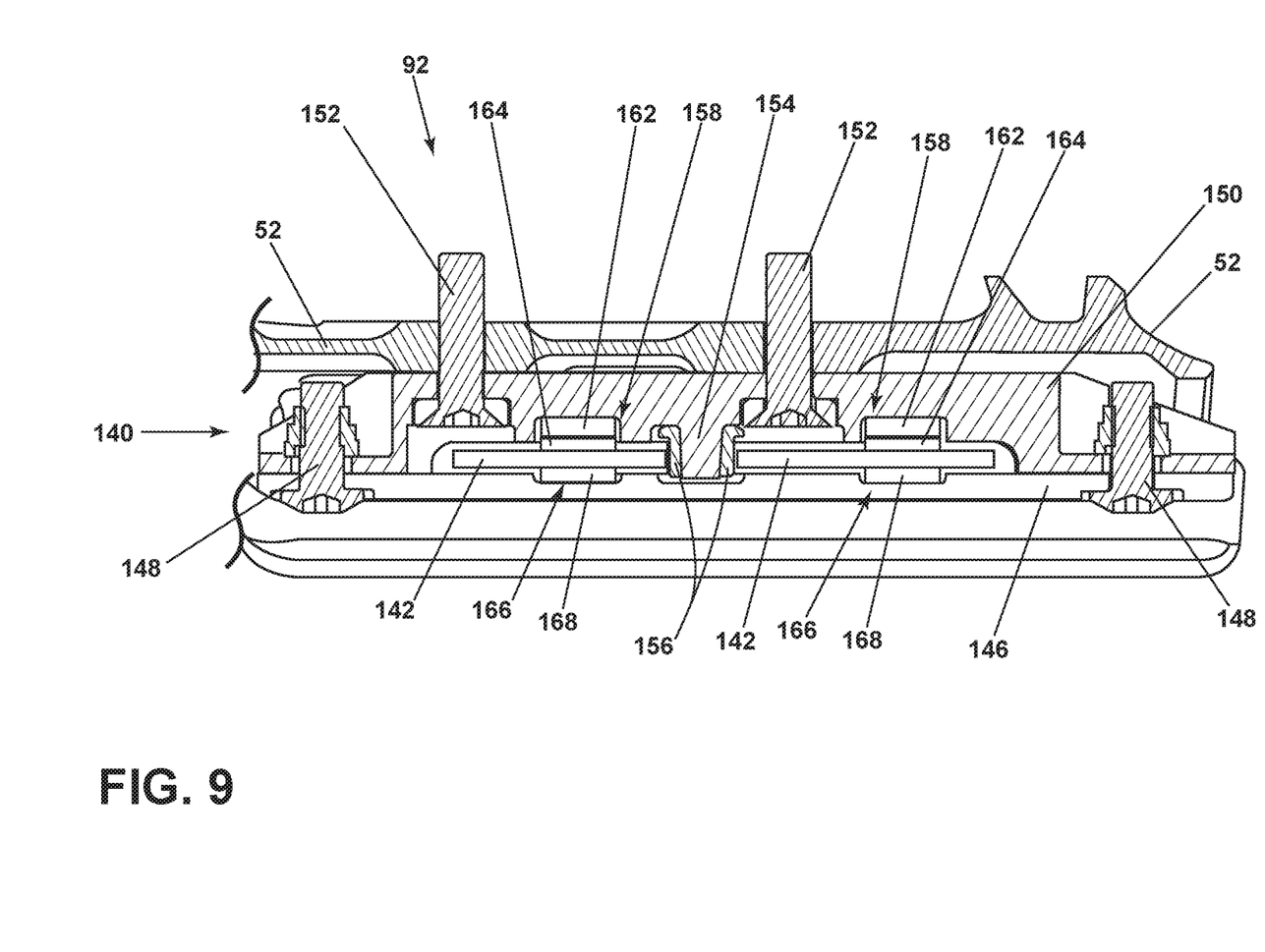
FIG. 9 is a cross-sectional view of the secondary locator of FIG. 7.

The base bracket 150 includes the positional locator post 154 and two recesses 158 positioned complementary to the recesses 166 of the cover plate 146. Two elastomeric pads 162 and two wear attenuator pads 164 are disposed in the recesses 158. The wear attenuator pads 164, 168 of both the cover plate 146 and the base bracket 150 abut the extension 142 to sandwich the extension 142. The elastomeric pads 162 are vibration attenuators and can be made of silicone in one non-limiting example. The elastomeric pads 162 compensate for wear of the attenuator pads 164, 168 and further provide for dampening of vibrations at the collar 140 during high cycle fatigue. The wear attenuator pads 164, 168, for example, can be made of a low coefficient of friction wear resistant material, such as polyether ether ketone (PEEK), while similar thermoplastic polymers and other wear resistant materials are contemplated. The wear attenuator pads 164, 168 provide for the sliding movement of the extensions 142 relative to the collar 140 during thermal expansion without excessive wear. Additionally, the wear attenuator pads 164, 168 provide for radial location preservation of the extensions 142 and the collar 140.

The wear attenuator collar 156 is disposed around the positional locator post 154. The wear attenuator 156 disposed around the post 154 and can be hollow for receiving the post 154. The extensions 142 are positioned within the collar 140 having the post 154 positioned within the slot 144. The wear attenuator collar can be made of similar material to the wear attenuator pads 164, 168, such as the low coefficient of friction wear resistant material. The wear attenuator collar 156 protects the post 154 during sliding movement of the extensions 142 along the post 154, while preserving axial location of the collar 140. The post 154 is configured to locate the surface cooler 50 with respect to the casing 52, fixing the surface cooler 50 relative to the casing 52 while permitting thermal expansion in the rotational degree of freedom about the Z-axis. The rotational degree of freedom about the Z-axis is permitted by slidable movement of the extension 142 relative to the collar 140 by sliding the extension 142 in and out of the collar 140 at the slot 144.

Figure 10:
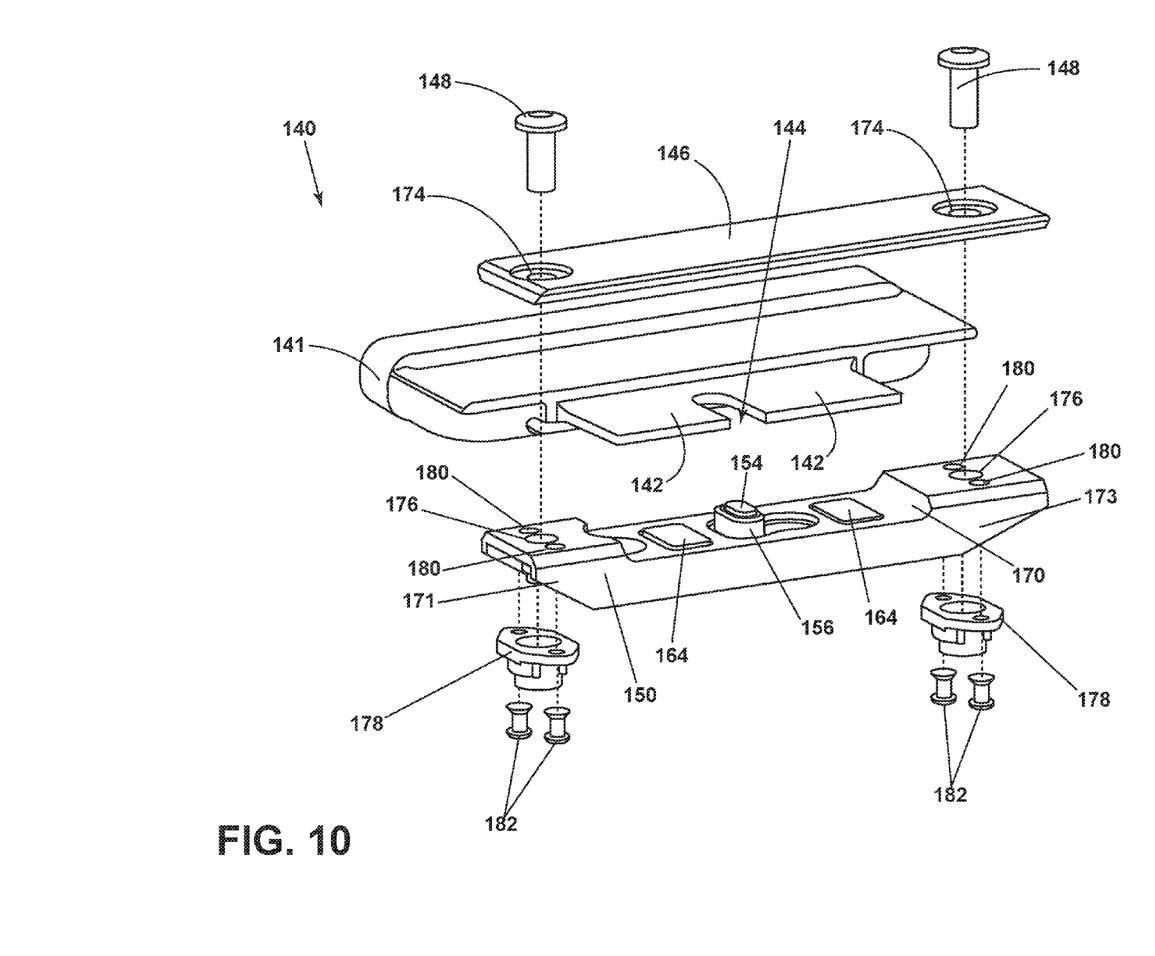
FIG. 10 is an exploded view of the secondary locator of FIG. 7 having a cover portion and a base portion.

Referring to FIG. 10, an exploded view of the collar 140 better illustrates the mounting installation of the cover plate 146 and the base bracket 150. The cover plate 146 includes two mount apertures 174. The base bracket 150 further includes a recessed portion 170, a forward end 171 and an aft end 173. The post 154 and wear attenuator pads 164 are disposed within the recessed portion 170. The base bracket 150 can further include two mount apertures 176 and two sets of rivet apertures 180 disposed on the ends 171, 173. The recessed portion 170 provides room for insertion of the extension 142 of the exchanger manifold 141. The extensions 142 rest on the wear attenuator pads 164, with the post 154 disposed in the slot 144. The fasteners 148 mount the cover plate 146 to the base bracket 150 to secure the extensions 142 within the recessed portion 170.

The collar 140 can further include a nut plate 178 with two rivets 182. The fasteners 148 extend through the mount apertures 174 in the cover plate 146 and through the mount apertures 176 in the base bracket 150 to fasten to the nut plates 178. The rivets 182 can extend through the nut plate 178 and into the rivet apertures 180 to fasten the nut plates 178 to the base bracket 150. Thus, the extensions 142 are fixed within the collar 140 relative to five degrees of freedom, while permitting slidable movement of the exchanger manifold 141 along the positional locator post 154 at the slot 144 in the Z-axis rotational degree of freedom.

Figure 11:
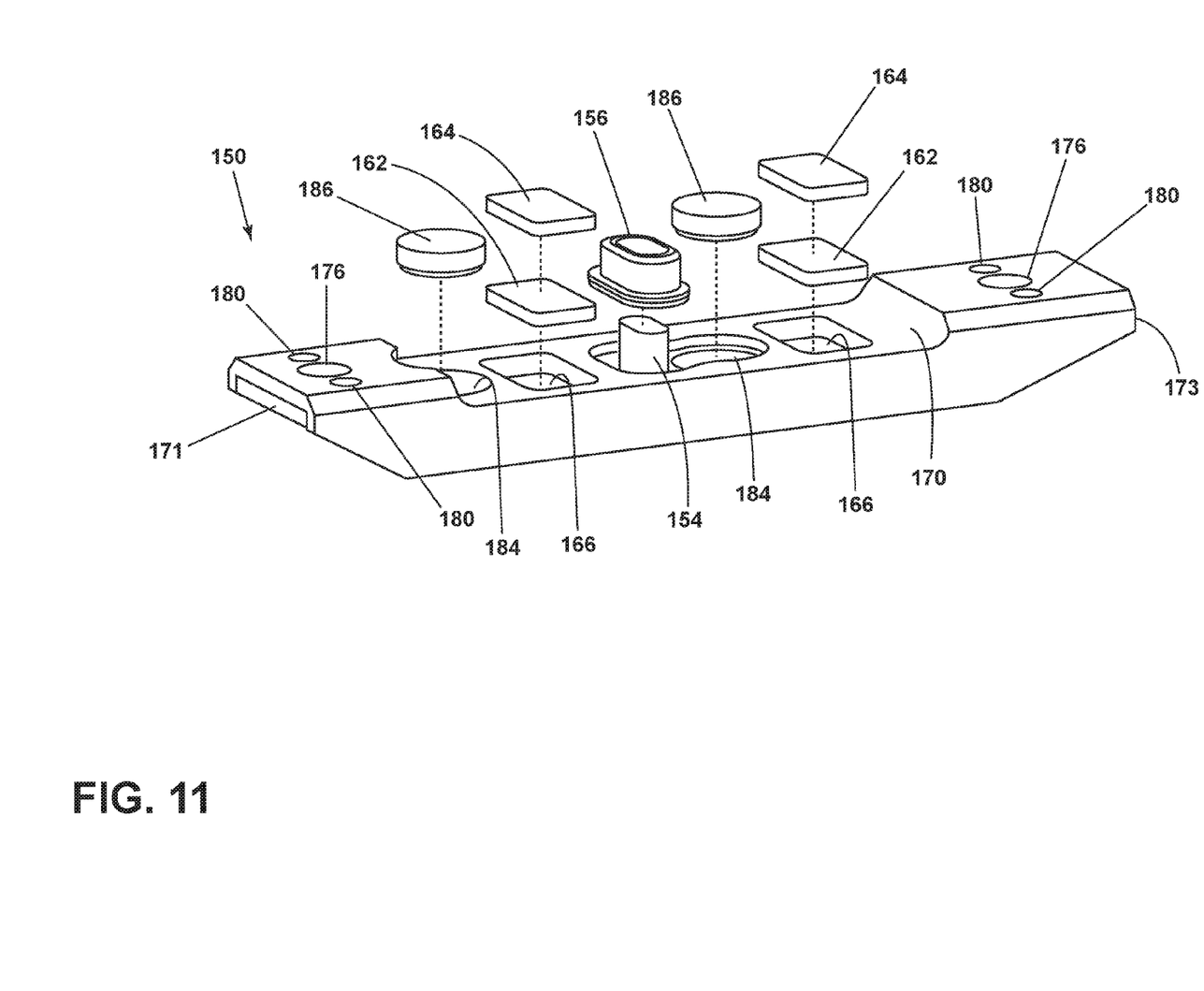
FIG. 11 is an exploded view of the base portion of the bracket mount of FIG. 10.

Referring now to FIG. 11, an exploded view of the base bracket 150 illustrates the assembly for the base bracket plate 150. The base bracket 150 further includes two mount recesses 184 and two nuts 186 shaped complementary to the mount recesses 184. The mount recesses 184 are disposed in the recessed portion 170. The nuts 186 accept the insertion of the fasteners 152 (FIG. 9) for mounting the base bracket 150 to the casing 52. The nuts 186 are adapted to be received in the mount recesses 184 for alignment of the fasteners 152 while preventing wear of the base bracket 150 by the fasteners 152 which can be caused by direct contact.

Figure 12:
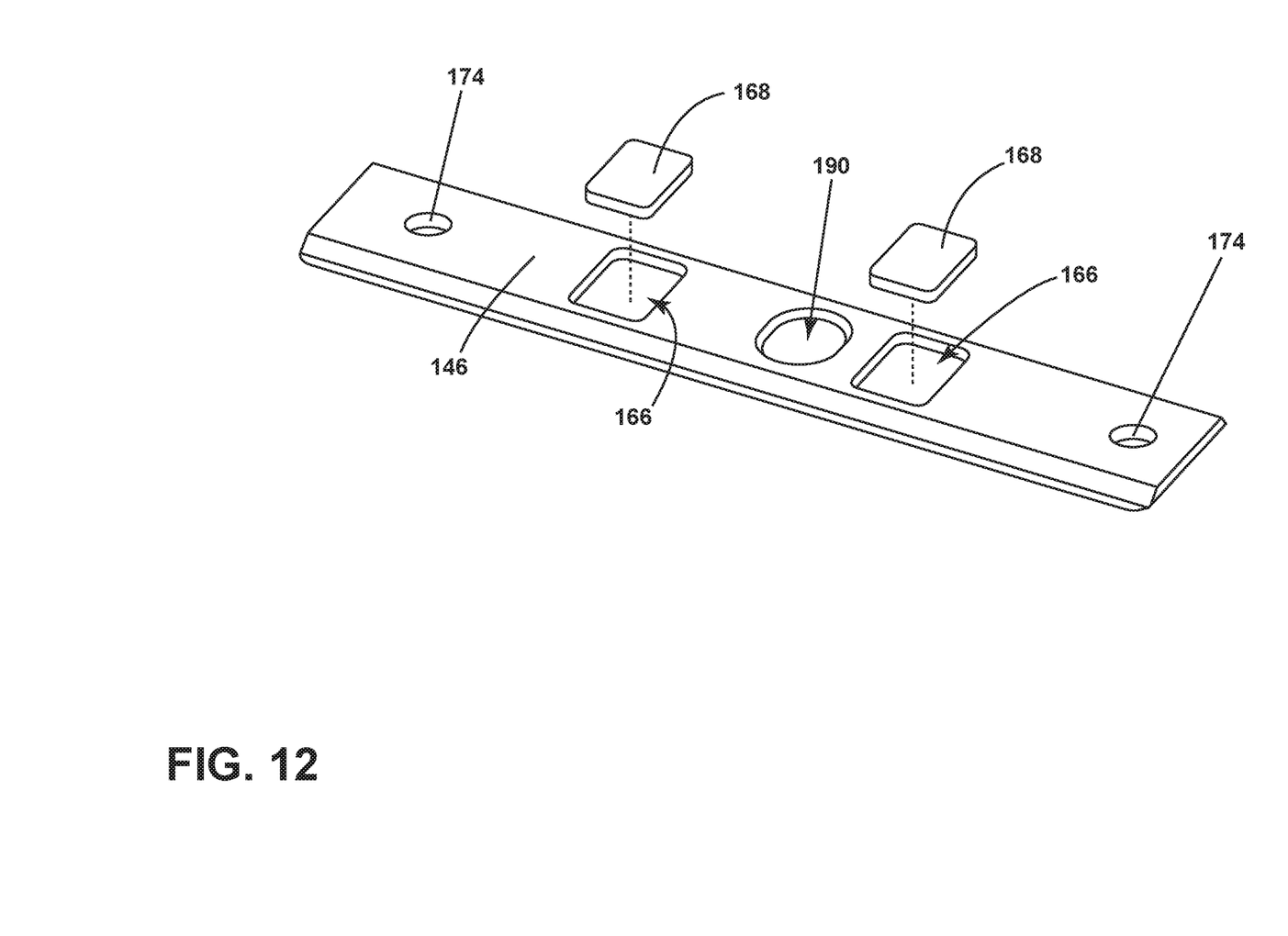
FIG. 12 is an exploded view of the cover portion of the bracket mount of FIG. 10.

Referring now to FIG. 12, the cover plate 146 includes a post recess 190 in addition to the other two recesses 166. The post recess 190 provides room for the radial extension of the post 154.

It should be appreciated that the first and second connection assemblies 90, 92 for the surface cooler 50 permit proper turbine engine surface cooler 50 attachment and axial positioning. The first connection assembly 90 is fixed in all degrees of freedom to ensure precise positioning of the surface cooler 50 to prevent movement into the 'keep out zones.' The first connection assembly 90 includes the location post 118 and threaded insert 120 integral to the manifold 110. The location post 118 is a precision, low clearance fit that penetrates the case 52 to allow a lower profile fit at the engine, while retaining the fixed position of the surface cooler 50 in all six degrees of freedom.

The second connection assembly 92 is fixed in all degrees except for the rotational degree of freedom about the Z-axis, permitting thermal growth to resolve itself during engine operation. The second connection assembly 92 is a stand-alone bracket that contains the post 154 permitting circumferential expansion of surface cooler 50. The slot 144 provides room for slidable movement of the heat exchanger manifold 141 in the third rotational degree of freedom, being rotated about the Z-axis. Thus, as the surface cooler 50 thermally expands during engine operation, the heat exchanger manifold 141 can slide within the slot 144. Additionally, the use of PEEK wear collars and pads 156, 164, 168 and elastomeric pads 162 permits the thermal movement of the extensions 142 of the exchanger manifold 141 while minimizing wear and dampening high cycle fatigue vibration to increase component lifetime. Additionally, the second connection assembly 92 allows for maximum finned areas, assured surface cooler installation kinematic, precision location, and self-compensation of wear and mechanical entrapment of parts.

The above-described embodiments provide for a compact and simplified design that provides a variety of additional benefits including ease of assembly and facilitates operation within a wide range of thermal environments, as well as increases part lifetime. Further, axial length constraints and radial length constraints can be achieved. The first and second connection assemblies provide for mounting the surface cooler to the aft casing. The first connection assembly is fixed in all six degrees of freedom to prevent movement during high cycle fatigue vibrations. The second connection assembly is free to rotate about an axial Z-axis, being free to move, expand, or contract during changes in temperatures.

To the extent not already described, the different features and structures of the various embodiments can be used in combination with each other as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fan casing assembly comprising:
   a casing having a peripheral wall;
   an annular fan cooler having a first surface confronting the peripheral wall and having a first end spaced from a second end and opposing forward and aft edges;
   a first connection assembly having a location post configured to locate the first end of the annular fan cooler to the casing and prevent forward movement and aft movement of the casing; and
   a second connection assembly having a positional locator that is configured to locate the second end of the annular fan cooler with respect to the casing and where the position locator allows for circumferential thermal growth;
   wherein the positional locator comprises a bracket that is mounted to a portion of the casing and confines a portion of the second end of the annular fan cooler; and
   wherein the bracket comprises a post that is received within a slot located on the second end of the annular fan cooler.

2. The fan casing assembly of claim 1 wherein the bracket comprises forward and aft edges that confine edges of a manifold of the annular fan cooler.

3. The fan casing assembly of claim 1, further comprising a collar positioned around the post.

4. The fan casing assembly of claim 1 wherein the positional locator further comprises a bracket cover plate that mounts to the bracket and retains a portion of the second end of the annular fan cooler.

5. The fan casing assembly of claim 4, further comprising a wear attenuator located between the bracket cover plate and the portion of the second end of the annular fan cooler.

6. The fan casing assembly of claim 1, further comprising a wear attenuator located between the bracket and at least a portion of the annular fan cooler.

7. The fan casing assembly of claim 6, further comprising a vibration attenuator located between the wear attenuator and the bracket, and wherein the wear attenuator is made from a low coefficient of friction wear resistant material.

8. The fan casing assembly of claim 1 wherein the location post is a precision machined pin having a threaded insert that is integral to a manifold of the annular fan cooler.

9. The fan casing assembly of claim 8 wherein the first connection further comprises a bolt received within the threaded insert and a portion of the casing.

10. The fan casing assembly of claim 1 wherein the location post fixes the annular fan cooler in all degrees of freedom.

11. The fan casing assembly of claim 1 wherein the positional locator constrains all other degrees of freedom.

12. A fan casing assembly comprising:
a casing having a peripheral wall;
an annular fan cooler having a first surface confronting the peripheral wall and having a first end spaced from a second end and opposing forward and aft edges; and
a first connection assembly having a location post configured to locate the first end of the annular fan cooler to the casing and prevent forward movement and aft movement of the casing;
a second connection assembly having a positional locator that is configured to locate the second end of the annular fan cooler with respect to the casing and where the position locator allows for circumferential thermal growth;
a bracket forming at least a portion of the positional located and mounted to a portion of the casing and confining a portion of the second end of the annular fan cooler, the bracket including a post that is received within a slot located on the second end of the annular fan cooler.

13. The fan casing assembly of claim 12 wherein the first connection assembly is fixed in all degrees of freedom.

14. The fan casing assembly of claim 12 wherein the second connection assembly comprises a positional locator in the form of a bracket and bracket cover plate that can mount directly to the casing and slidably retain a portion of second end of the annular fan cooler.

15. The fan casing assembly of claim 12 wherein the positional locator constrains all other degrees of freedom except the circumferential direction.

16. A fan casing assembly comprising:
a casing having a peripheral wall;
an annular fan cooler having a first surface confronting the peripheral wall and having a first end spaced from a second end and opposing forward and aft edges;
a first connection assembly having a location post configured to locate the first end of the annular fan cooler to the casing and prevent forward movement and aft movement of the casing; and
a second connection assembly having a positional locator comprising:
a bracket that is mounted to a portion of the casing and confines a portion of the second end of the annular fan cooler, and
a bracket cover plate that mounts to the bracket and retains a portion of the second end of the annular fan cooler,
wherein the positional locator is configured to locate the second end of the annular fan cooler with respect to the casing allows for circumferential thermal growth; and
a wear attenuator located between the bracket cover plate and the portion of the second end of the annular fan cooler.

17. The fan casing assembly of claim 16, further comprising a collar positioned around the post.

18. The fan casing assembly of claim 16, further comprising a wear attenuator located between the bracket and at least a portion of the annular fan cooler.

19. The fan casing assembly of claim 18, further comprising a vibration attenuator located between the wear attenuator and the bracket, and wherein the wear attenuator is made from a low coefficient of friction wear resistant material.

20. The fan casing assembly of claim 16 wherein the location post fixes the annular fan cooler in all degrees of freedom.

* * * * *